United States Patent
Bensberg et al.

(10) Patent No.: US 10,997,178 B2
(45) Date of Patent: May 4, 2021

(54) IMPLICIT PARTITIONING

(71) Applicant: SAP SE, Walldorf (DE)

(72) Inventors: Christian Bensberg, Heidelberg (DE); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 16/437,799

(22) Filed: Jun. 11, 2019

(65) Prior Publication Data

US 2020/0394195 A1    Dec. 17, 2020

(51) Int. Cl.
*G06F 16/2455* (2019.01)
*G06F 16/22* (2019.01)

(52) U.S. Cl.
CPC .... *G06F 16/24554* (2019.01); *G06F 16/2246* (2019.01); *G06F 16/2272* (2019.01)

(58) Field of Classification Search
None
See application file for complete search history.

(56) References Cited

U.S. PATENT DOCUMENTS

| | | | |
|---|---|---|---|
| 8,180,690 B2* | 5/2012 | Mayle | G06Q 30/0603 705/27.1 |
| 8,738,657 B2 | 5/2014 | Harumi | |
| 9,384,227 B1* | 7/2016 | Xiao | G06F 16/278 |
| 2007/0156842 A1* | 7/2007 | Vermeulen | H04L 29/06047 709/217 |
| 2009/0055422 A1* | 2/2009 | Williams | H03M 7/30 |
| 2014/0032579 A1* | 1/2014 | Merriman | G06F 16/23 707/756 |
| 2015/0134796 A1* | 5/2015 | Theimer | G06F 16/258 709/223 |
| 2017/0091327 A1* | 3/2017 | Bostic | G06F 16/252 |
| 2018/0129696 A1 | 5/2018 | Bensberg et al. | |
| 2019/0310977 A1* | 10/2019 | Pal | G06F 16/2228 |
| 2020/0293532 A1* | 9/2020 | Uzar | G06F 9/4881 |

OTHER PUBLICATIONS

Idreos, et al., Self-organizing Tuple Reconstruction in Column-stores, SIGMOD'09, 2009, 12 pages.

(Continued)

*Primary Examiner* — Wilson Lee
(74) *Attorney, Agent, or Firm* — Mintz Levin Cohn Ferris Glovsky and Popeo, P.C.

(57) ABSTRACT

A method, a system and a computer program product for implicitly partitioning data. An index in a plurality of indexes is selected. The index corresponds to a plurality of ranges of data values stored in a plurality of database slices of a database. A partitioning structure for the selected index is generated. The partitioning structure includes a plurality of hierarchically arranged nodes. Each node corresponds to a range of data values in the plurality of ranges of data values stored and at least one database slice storing corresponding range of data values. Another range of data values is received for storage in the database. Using the partitioning structure, a node in the partitioning structure corresponding to the received range of data values and a corresponding database slice for storing the received range of data values are identified. The received range of data values is stored in the identified database slice.

20 Claims, 14 Drawing Sheets

(56) References Cited

OTHER PUBLICATIONS

Lehman, et al., A Study of Index Structures for Main Memory Database Management Systems, 1986, Proceedings of the twelfth International Conference of Very Large Data Bases, 1985, pp. 294-303.

Polychroniou, et al., A Comprehensive Study of Main-Memory Partitioning andits Application to Large-Scale Comparison-and Radix-Sort, SIGMOD'14, 2014, 12 pages.

* cited by examiner

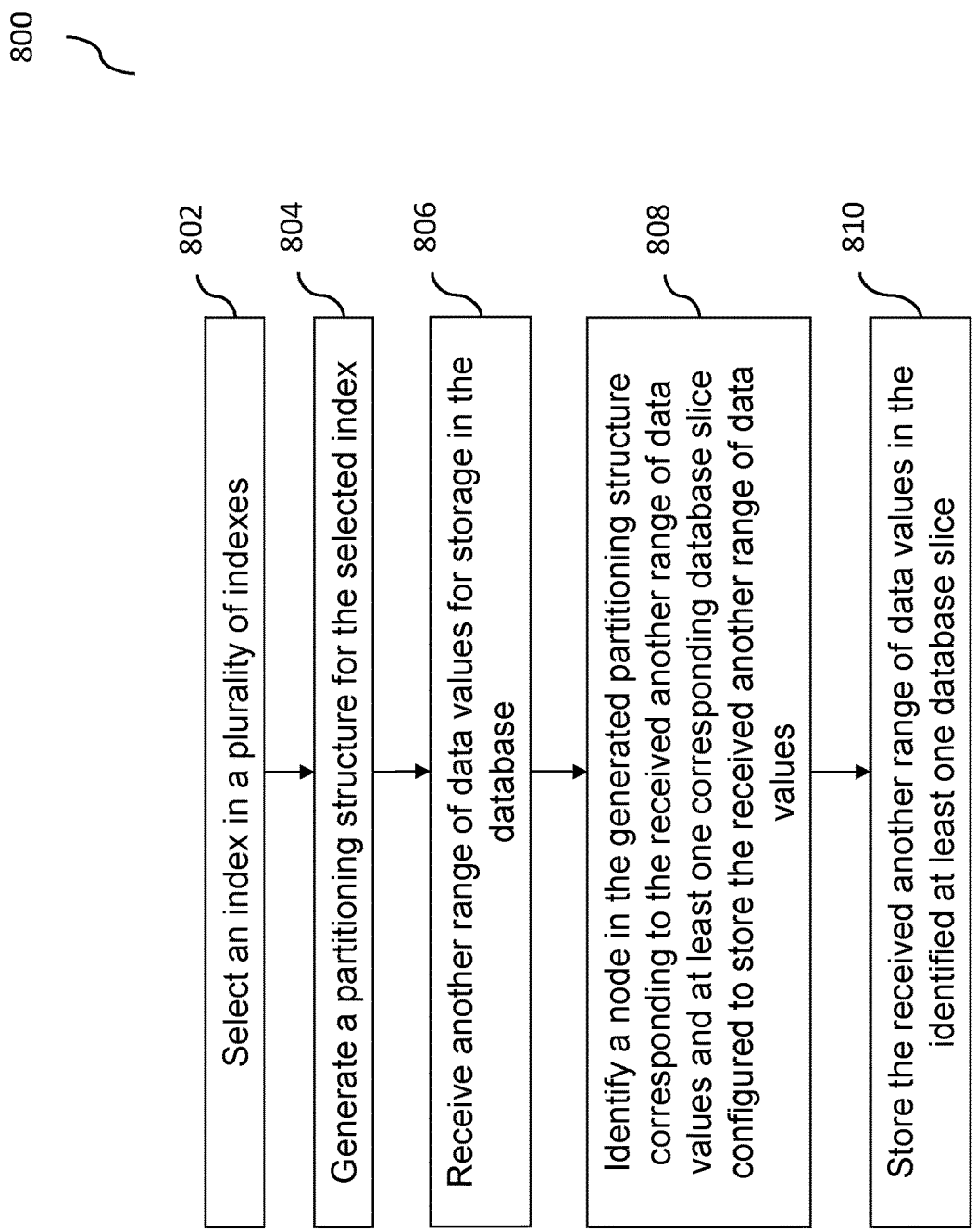

IMPLICIT PARTITIONING

TECHNICAL FIELD

This disclosure relates generally to data processing and, in particular, to implicit partitioning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Data stored by such systems may be stored in one or more partitions. Given the complexity of queries, volume of data stored, and/or their volume, the underlying databases face challenges in order to optimize performance.

SUMMARY

In some implementations, the current subject matter relates to a computer implemented method for implicitly partitioning data. The method may include selecting an index in a plurality of indexes, the index corresponding to a plurality of ranges of data values stored in a plurality of database slices of a database, generating a partitioning structure for the selected index, the partitioning structure including a plurality of hierarchically arranged nodes, each node corresponding to a range of data values in the plurality of ranges of data values stored and at least one database slice storing the corresponding range of data values, receiving another range of data values for storage in the database, identifying, using the generated partitioning structure, a node in the generated partitioning structure corresponding to the received range of data values and at least one corresponding database slice configured to store the received range of data values, and storing the received range of data values in the identified at least one database slice.

In some implementations, the current subject matter can include one or more of the following optional features. In some implementations, identification of nodes may include identifying another database slice configured to store the received another range of data values upon a determination that the identified database slice is unable to store the received range of data values. The storage may then include storing the received range of data values in the identified database slice.

In some implementations, identification of nodes may include generating another database slice configured to store the received range of data values. The method may further include modifying the generated partitioning structure to include at least another node corresponding to the received range of data values. Another database slice may be generated upon a determination that the identified database slice is unable to store the received range of data values. Then, storage may include storing the received range of data values in the generated database slice.

In some implementations, at least one of the node and the database slice may be identified using the selected index.

In some implementations, identification may be performed using at least one insert policy defining at least one of the node in the generated partitioning structure corresponding to the received range of data values and at least one corresponding database slice configured to store the received range of data values.

In some implementations, identification of nodes may include identifying, based on the insert policy, using the generated partitioning structure, another node in the generated partitioning structure corresponding to the received range of data values using a predetermined threshold hop distance between the identified node and the another node and identifying at least one database slice corresponding to another node configured to store the received range of data values. The predetermined threshold hop distance may be at least two hops.

In some implementations, storing may include at least one of the following: insertion of the received range of data into the identified at least one database slice, modification of data stored in the identified at least one database slice using the received range of data, deletion of data stored in the identified at least one database slice, and any combination thereof.

In some implementations, the method may further include selecting another index in a plurality of indexes, which may correspond to another plurality of ranges of data values stored in the plurality of database slices of the database, generating another partitioning structure for the selected index, which may include another plurality of hierarchically arranged nodes and each node may correspond to another range of data values in the plurality of other ranges of data values stored and the at least one database slice storing the corresponding range of data values, identifying, using the generated another partitioning structure and the generated partitioning structure, at least one database slice configured to store the received range of data values, and storing the received range of data values in the identified at least one database slice.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8 is an exemplary method, according to some implementations of the current subject matter.

DETAILED DESCRIPTION

Figure 1:
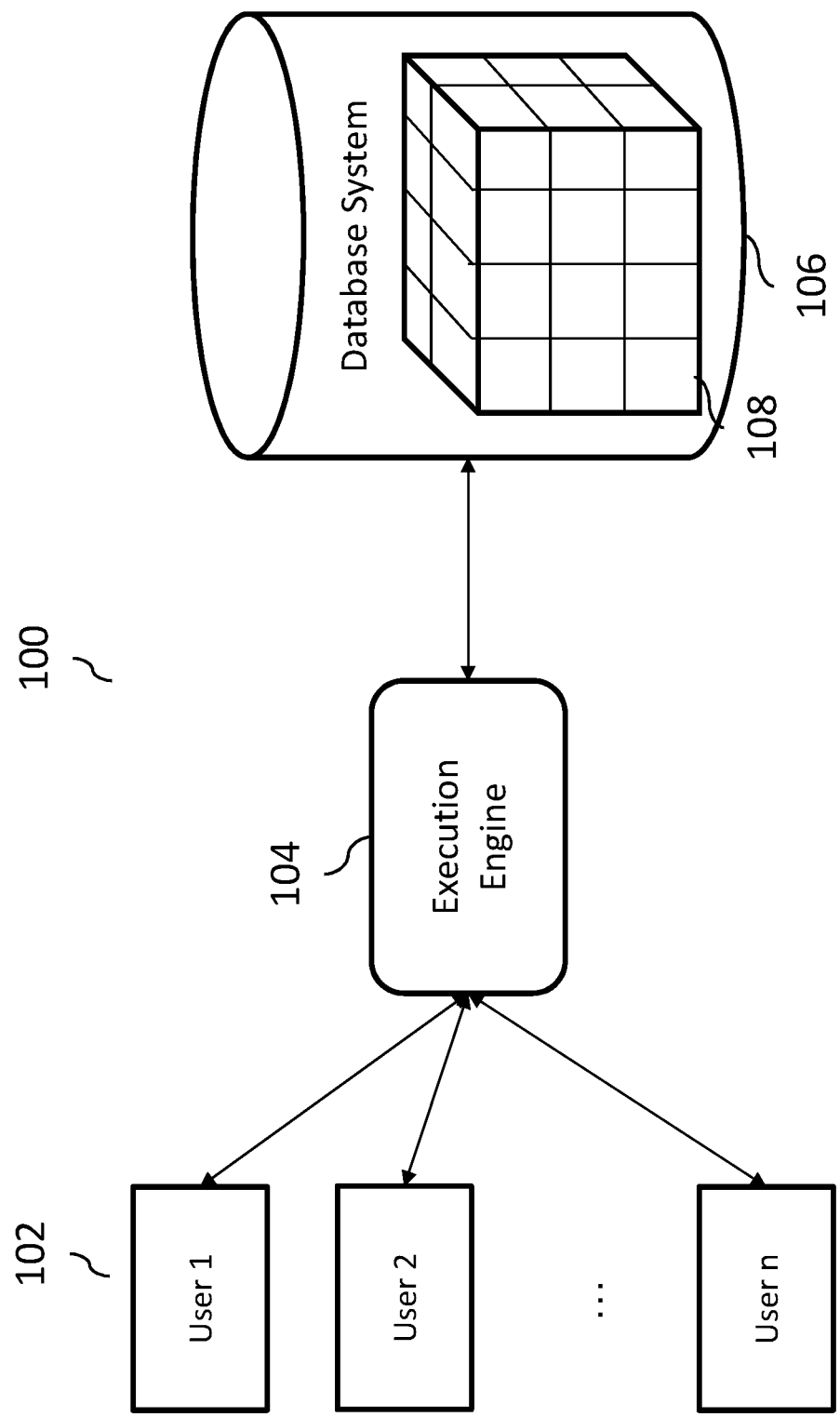
FIG. 1 illustrates an exemplary system for generating a partitioning specification, according to some implementations of the current subject matter.

To address these and potentially other deficiencies of currently available solutions, one or more implementations of the current subject matter relate to methods, systems, articles of manufacture, and the like that can, among other possible advantages, provide an ability to implicitly partition data for management, storage, retrieval, and/or any other operations.

Database management systems and operations performed on the data managed by a database management system have become increasingly complex. For example, a database management systems (or database for short) may support relatively complex online analytical processing (OLAP, which may perform multi-dimensional analysis) to more straightforward transaction-based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database may include a complex sequence of operations in order to generate corresponding responses. To implement the complex sequence, a query execution plan (or query plan for short) may be implemented. The query plan may represent a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer may need to be configured to handle the various types of databases and various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

Database systems may store data using one or more partitioning configurations. A partition in a database may refer to a division of a logical database or its elements into separate independent parts. Partitioning allows improved manageability, performance, load balancing, etc. In some cases, partitions may be distributed over multiple nodes, where each node may allow users to perform various operations (e.g., execution of transactions, etc.) on a partition. Such distribution may increase performance for nodes that may be subject to frequent transactions that may involve retrieval, insertion, modification, generation of views of data, etc. while at the same time maintaining availability and security of data. Data partitioning may be performed by building separate smaller databases, splitting selected elements, etc. Data may be partitioned using horizontal or vertical partitioning methodologies. A horizontal partitioning may place different rows into different tables (e.g., splitting users of different age groups). A vertical partitioning may create new tables having fewer columns and may use additional tables to store any remaining columns.

Data may be partitioned using "static partitioning". For example, an administrator and/or a software application may define specific data ranges that may be used for the purposes of partitioning data. This may typically require specific knowledge of data, actual ranges of data values, and/or any other parameters for the purposes of defining such predetermined partitioning. At runtime, upon execution of queries, because of the predetermined data partitioning schemes, certain partitions may be excluded from being queried and/or from a result data set. In some implementations, this behavior may even be enhanced using "synopsis" (or outline) per partition: if known, this may allow for further "pruning" (or exclusion) of certain data partitions. However, use of such static partitioning may be cumbersome as it may not only require knowledge of actual data value ranges and might not efficiently accommodate for growth of and/or changes to data.

In some implementations, the current subject matter may implicitly partition data without a priori knowledge of data values and/or specific data ranges, where partitioning of data is performed "on-a-fly" by determining ideal partitioning points of data values. Such implicit partitioning may effectively accommodate growth of data as well as changes to data values through modification, insertion, deletion, etc. Further, the current subject matter may perform modification of a previous partitioning structure (that had been determined on a previous state of data values) upon insertion (and/or modification, deletion, etc.) of data values to ensure that with the inserted (and/or modified, deleted, etc.), the data values are optimally partitioned. A partitioning structure may be defined in a form tree for an index identifying specific data values sets in a database, as will be discussed below. Each node (or a leaf, which will be used interchangeably) in the tree may be indicative of specific range of data values, e.g., index "id"<200 corresponding to one branch (i.e., a node with any linked child nodes) of data value ranges in the partitioning specification tree; index "id"≥200 corresponding to another branch, etc., which in turn, may be subdivided "on-the-fly" even further. Insertion of new data may cause creation of new slices (e.g., new small partitions)

corresponding to new data range values and hence, further branching of the partitioning tree. Slices may be created based on a specific insertion policy that may be pluggable and subject to change. For example, the policy may define that a new slice may need to be created even if a particular slice is not full (i.e., new data values may be inserted); alternatively, the policy may define that a new slice may not be created until there is a certain distance between nodes in the tree for a particular data values range. Further, a specific index, for which, a partitioning specification tree is created, may be used for determining a right slice that contains specific data values range, which may be useful for the purposes of partition pruning.

In some implementations, the current subject matter may be configured to generate a partitioning specification for data that may be stored in a database system. As stated above, the partitioning specification may be defined "on the fly" using slices of data that are included in the database and/or its partitions (it may be assumed that the data stored in the database is implicitly partitioned) and/or any new data values ranges that may be provided for insertion (e.g., causing generation of new slices). The current subject matter may generate a partition specification using a tree structure, where nodes in a tree may correspond to specific data slices in the database. Data slices may be relatively small, whereby data movement across boundaries of slices may be prevented.

FIG. 1 illustrates an exemplary system 100 for generating a partitioning specification, according to some implementations of the current subject matter. The system 100 may include one or more users (user 1, user 2, . . . user n) 102, an execution engine 104, and a database system 106, which may store data in one or more slices 108. The users 102, the execution engine 104, and the database system 106 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 106 may include at least one of the following: databases, storage locations, memory locations, and/or any combination of hardware and/or software components. In some implementations, the database system 106 may be a High Performance Analytic Appliance ("HANA") system as developed by SAP SE, Walldorf, Germany, as will be described below.

The execution engine 104 may include any combination of software and/or hardware components and may be configured to receive and execute a query from one or more users 102 to obtain data from one or more slices 108 in the database system 106, insert data into from one or more slices 108 the database system 106, modify data stored from one or more slices 108 in the database system 106, delete data stored from one or more slices 108 in the database system 106, generate one or more new slices 108 (e.g., for insertion of new data), etc., and any combination thereof. In some implementations, the execution engine 106 may be included in the database system 106. Data may be inserted, modified, deleted, etc., new slices may be created, existing slices may be modified, deleted, etc. using one or more pluggable policies, which may cause modification of an existing defined partitioning tree structure (e.g., addition of further tree branches, splitting of tree branches, etc.).

Execution of a query may typically require generation of a query plan or query execution plan, which may be an ordered set of operations that may be used to access stored data (e.g., access data in a SQL relational database management system). Upon submission of a query to the database system 106, requested data may be retrieved based on parameters of the query. The retrieved data may be aggregated/joined with any other data that may be sought by the user. Insertion, modification, deletion, etc. of data in the database system 106 may be performed using various SQL or other statements.

Figure 2:
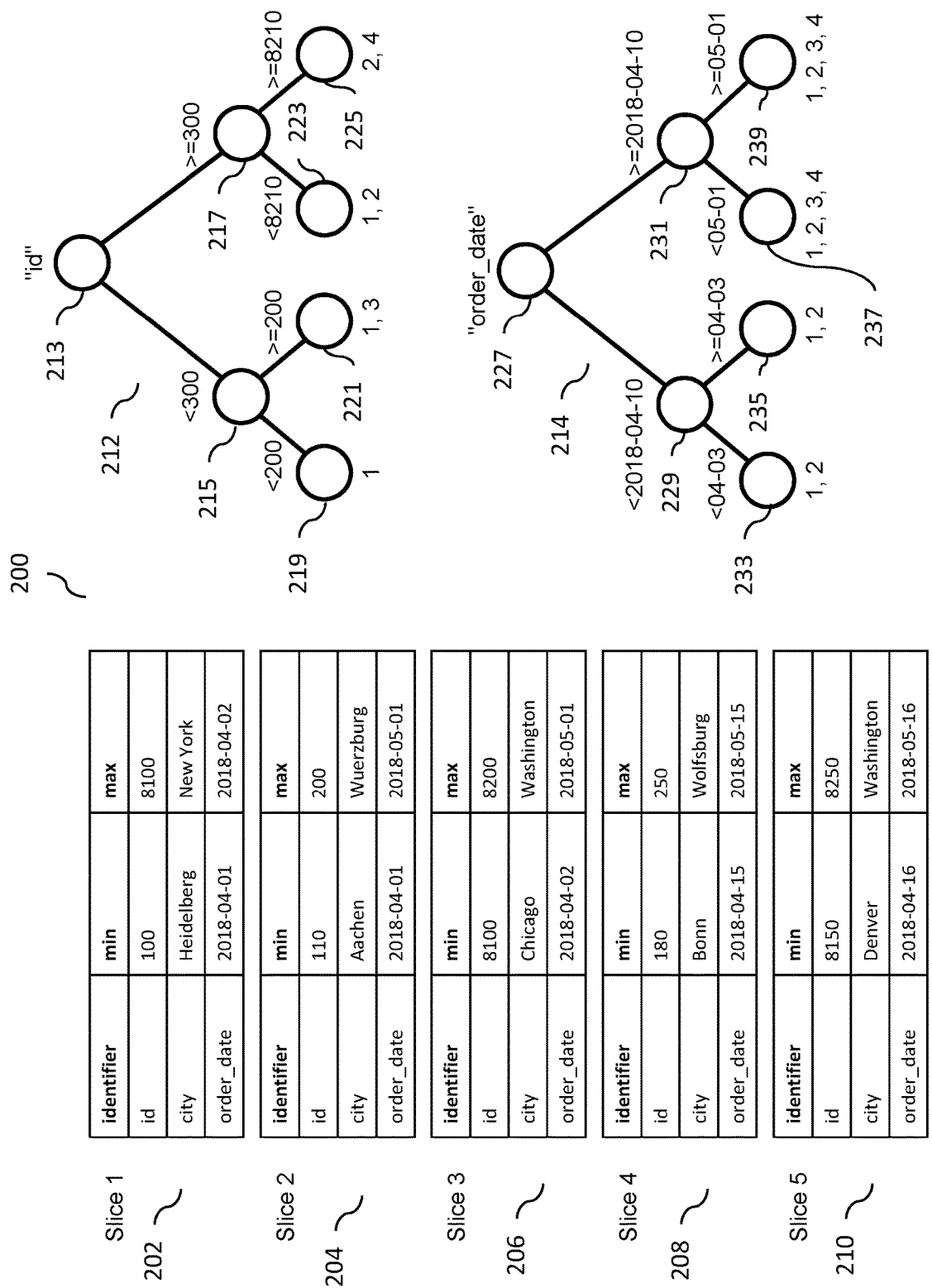
FIG. 2 illustrates exemplary partitioning specifications (e.g., in the form of tree structures) that have been generated based on one or more slices, according to some implementations of the current subject matter.

FIG. 2 illustrates exemplary partitioning specifications 212 and 214 (e.g., in the form of tree structures) that have been generated based on one or more slices 1-5 202-210. As shown in FIG. 2, slices 202-205 may be tables that may include an index. For example, slice 1 202 may include an identifier column along with minimum ("min") and maximum ("max") value columns. The identifier column may include an "id", "city" and "order_date". Each of these include a range of values, for example, the "id" identifier may include a range of "100-8100", the "city" identifier may include a range of "Heidelberg-New York", and the "order_date" identifier may include a range of "2018-04-01-2018-04-02".

Similarly, slice 2 204 may include different ranges for its identifiers. For example, the "id" identifier range may be "110-200"; the "city" identifier may include a range of "Aachen-Wuerzburg", and the "order_date" identifier may include a range of "2018-04-01-2018-05-01". In slice 3 206, the "id" identifier may include a range of "8100-8200", the "city" identifier may include a range of "Chicago-Washington", and the "order_date" identifier may include a range of "2018-04-02-2018-05-01". In slice 4 208, the "id" identifier may include a range of "180-250", the "city" identifier may include a range of "Bonn-Wolfsburg", and the "order_date" identifier may include a range of "2018-04-15-2018-05-15". Lastly, in slice 5 210, the "id" identifier may include a range of "8150-8250", the "city" identifier may include a range of "Denver-Washington", and the "order_date" identifier may include a range of "2018-04-16-2018-05-16". In some implementations, the slices may be also organized by subject matter (e.g., slices 2 and 4 include data related to orders in the United States; slices 3 and 5 include data related to orders in Germany, and slice 1 includes all data relating to orders in the United States and Germany).

In some implementations, the slices may be used to generate a partition specification (e.g., trees 212 and 214) where data may be organized based on ranges identified in the slices in accordance with the identifiers. The partition specifications may be used for insertion, retrieval, modification, deletion, etc. of data stored in the slices. These specifications may be used for creation of new slices of data, if necessary or desired. For example, the data range values shown in FIG. 2 may be already implicitly partitioned by virtue of having slices 2 and 4 containing data range values for Germany and slices 3 and 5 containing data range values for the United States. The partitioning tree structure (e.g., structure 212) may be defined and further grown and/or modified using this information as well as further data range values and/or newly created data slices that may be added.

As shown in FIG. 2, the tree 212 may be hierarchically organized based on the identifier "id" in the slices 1-5, with the identifier "id" being a parent node 213 and may be linked to one or more child nodes. For example, the "id" parent node 213 may be linked to a node 215 corresponding to "id" being in a range of less than 300 ("<300") and a node 217 corresponding to "id" being in a range of greater than or equal to 300 ("≥300"). As can be understood, any other number or numbers may be used for generation of a partitioning specification based on this tree. Further, more than one node may be linked to the parent node 213.

The node 215 may be further linked to child nodes 219 and 221, where node 219 may include data corresponding to "id" identifier being less than 200 ("<200") and node 221 may include data corresponding to "id" identifier being greater than or equal to 200 ("≥200"). Further, node 217 may be linked to child nodes 223 and 225, where the child node 223 may include data corresponding to "id" identifier being less than 8210 ("<8210") and node 225 may include data corresponding to "id" identifier being greater than or equal to 8210 ("≥8210").

Based on this partitioning, node 219 may correspond to some or all of the data in slice 1; node 221 may correspond to some or all of the data in slices 1 and 3; node 223 may correspond to some or all of the data in slices 1 and 2, and node 225 may correspond to some or all of the data in slices 2 and 4. Using this partitioning specification, data corresponding to specific "id" identifier may be retrieved, inserted, modified, deleted, etc. In that regard, a query of SELECT*FROM Orders WHERE "id"=160 would result in selection of slice 1 202 (corresponding to node 219) for the purposes of performing data management functions. In some implementations, these data management functions may be dependent on whether or not a particular slice is full, locked, etc. A new slice, as will be discussed below, may be created, such as for insertion of new data.

Similarly, the tree 214 may be hierarchically organized based on the identifier "order_date" in the slices 1-5, with the identifier "order_date" being a parent node 227. The "order_date" parent node 227 may be linked to nodes 229 and 231, where node 229 including data corresponding to "order_date" being in a range of less than 2018-04-10 ("<2018-04-10") and node 231 corresponding to "order_date" being in a range of greater than or equal to 2018-04-10 ("≥2018-04-10"). As can be understood, any other order date or dates may be used for generation of a partitioning specification based on this tree and/or more than one node may be linked to the parent node 227.

The node 229 may be further linked to child nodes 233 and 235, where node 229 may include data corresponding to "order_date" identifier being less than 2018-04-03 ("<2018-04-03") and node 235 may include data corresponding to "order_date" identifier being greater than or equal to 2018-04-03 ("≥2018-04-03"). Further, node 231 may be linked to child nodes 237 and 239, where the child node 237 may include data corresponding to "order_date" identifier being less than 2018-05-01 ("<2018-05-01") and node 231 may include data corresponding to "order_date" identifier being greater than or equal to 2018-05-01 ("≥2018-05-01").

Based on this partitioning, node 233 may correspond to some or all of the data in slices 1 and 2; node 235 may correspond to some or all of the data in slices 1 and 2; node 237 may correspond to some or all of the data in slices 1, 2, 3 and 4; and node 239 may correspond to some or all of the data in slices 1, 2, 3, and 4.

Figure 3A:
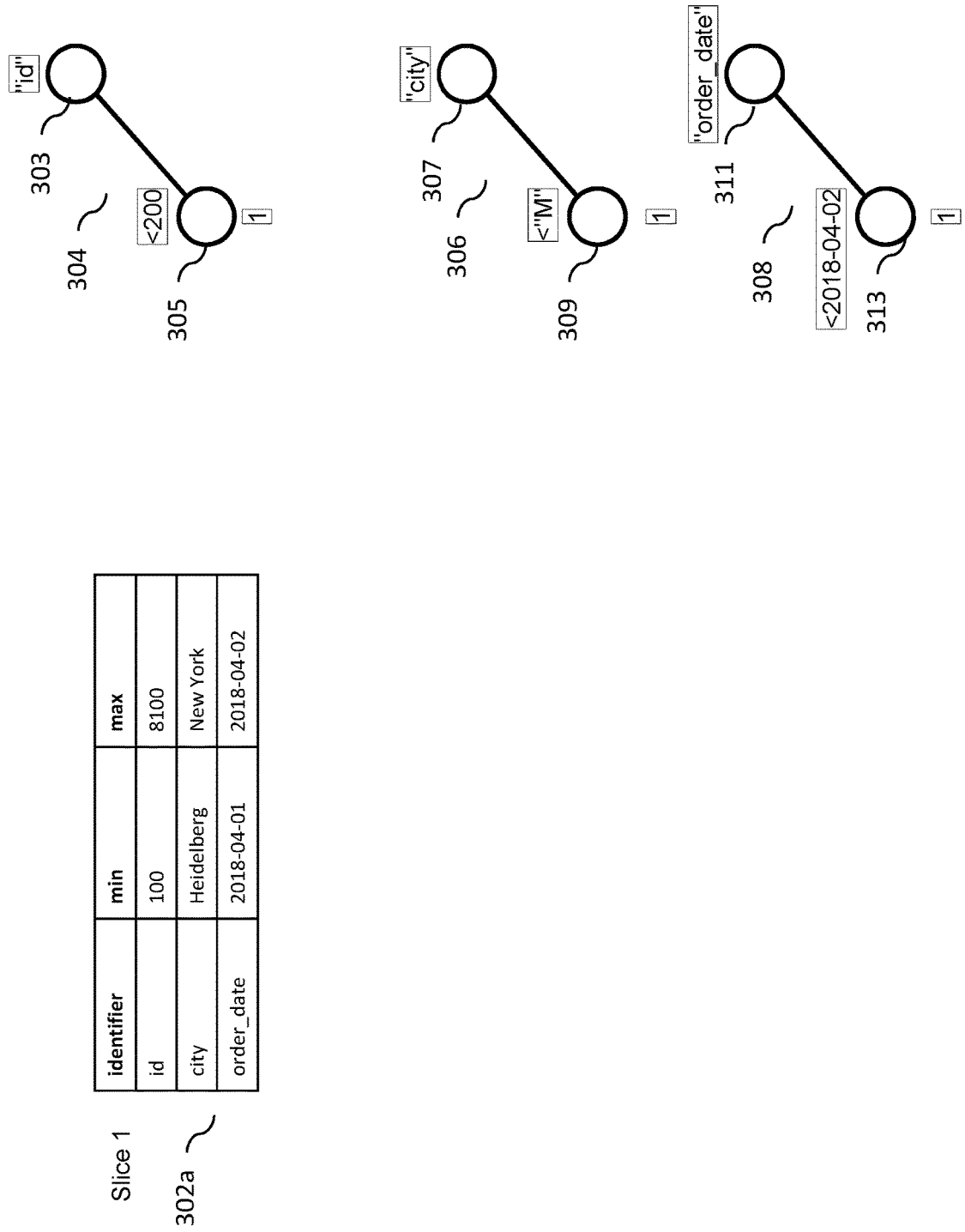
FIGS. 3a-3g illustrate various stages of an exemplary process of generating a partitioning specification, according to some implementations of the current subject matter.

FIGS. 3a-3g illustrate various stages of an exemplary process of generating a partitioning specification, according to some implementations of the current subject matter. In some exemplary implementations, the partitioning specification may be initiated using an INSERT statement (e.g., INSERT {"id": 100, "city": "Heidelberg", "order_date": "2018-04-01"}). Assuming slice 1 302, as shown in FIG. 3a, is not full, each of indexes "id", "city" and "order_date" may be used to generate a tree that corresponds to the specific index (as shown in FIG. 3a, slice 1 302a includes data value of "New York" for "city" index, which is not visible in the tree 304; if the max value of index "id" was equal to "100", i.e., same as the min value, then the tree and the slice would be synchronized). For example, a tree 304 having nodes 303 and 305 may correspond to the index "id" (i.e., the parent node 303 may correspond to "id" and may be linked to the child node 305 that may correspond to values of "id" being less than 200 ("<200"), which may be determined heuristically for the purposes of defining an initial data values range boundaries). A tree 306 having nodes 307 and 309 may correspond to the index "city" (i.e., the parent node 307 may correspond to "city" and may be linked to the child node 309 that may correspond to values of "city" being less than M ("<M") (assuming "city" lists cities in alphabetical order)). A tree 308 may having nodes 311 and 313 may correspond to the index "order_date" (i.e., the parent node 311 may correspond to "order_date" and may be linked to the child node 313 that may correspond to values of "order_date" being less than 2018-04-02 ("<2018-04-02")). The data corresponding to the INSERT statement would be inserted into slice 1 302.

Figure 3B:
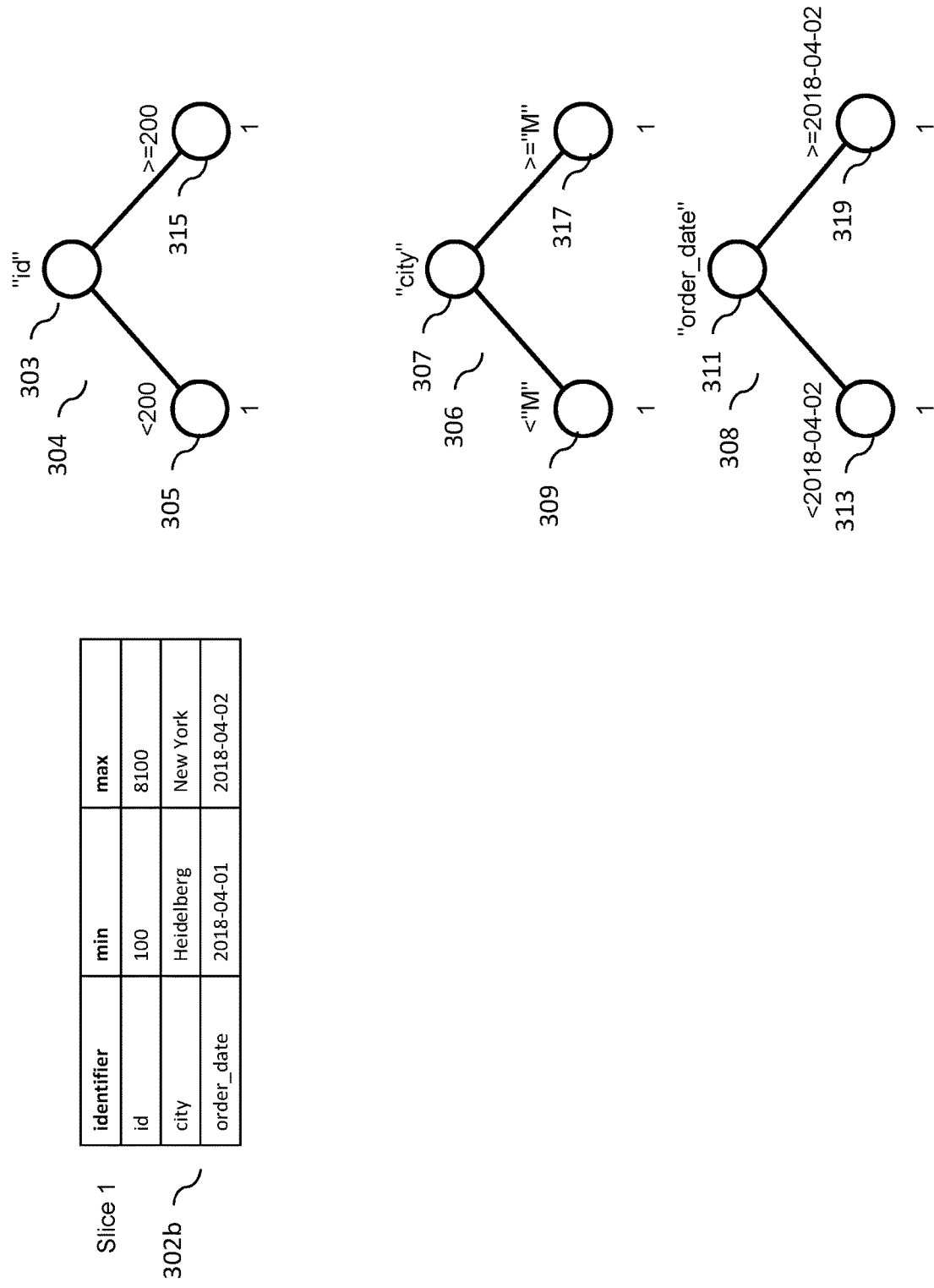

FIG. 3b illustrates insertion of further data into slice 1 302 (slice 302b as shown in FIG. 3b) (assuming it is not full) in addition to the data that has been already inserted as shown in FIG. 3a. Insertion of data may be accomplished using the following statements:

INSERT
{"id": 100, "city": "Heidelberg", "order_date": "2018-04-01"}
{"id": 8050, "city": "New York", "order_date": "2018-04-02"}

Because the additional INSERT statement includes further data, additional nodes may be linked with one or more indexes 304, 306, 308 as shown in FIG. 3b. For example, parent node "id" 303 may be linked with node 315 that may correspond to "id" data values being greater or equal to 200 (i.e., "id": "8050"). Further, parent node "city" 307 may be linked with node 317 that may correspond to "city" data values being greater or equal to M (i.e., "city": "New York"). Parent node "order_date" 311 may be linked with node 319 that may correspond to "order_date" data values being greater or equal to 2018-04-02 (i.e., "order_date": "2018-04-02").

Figure 3C:
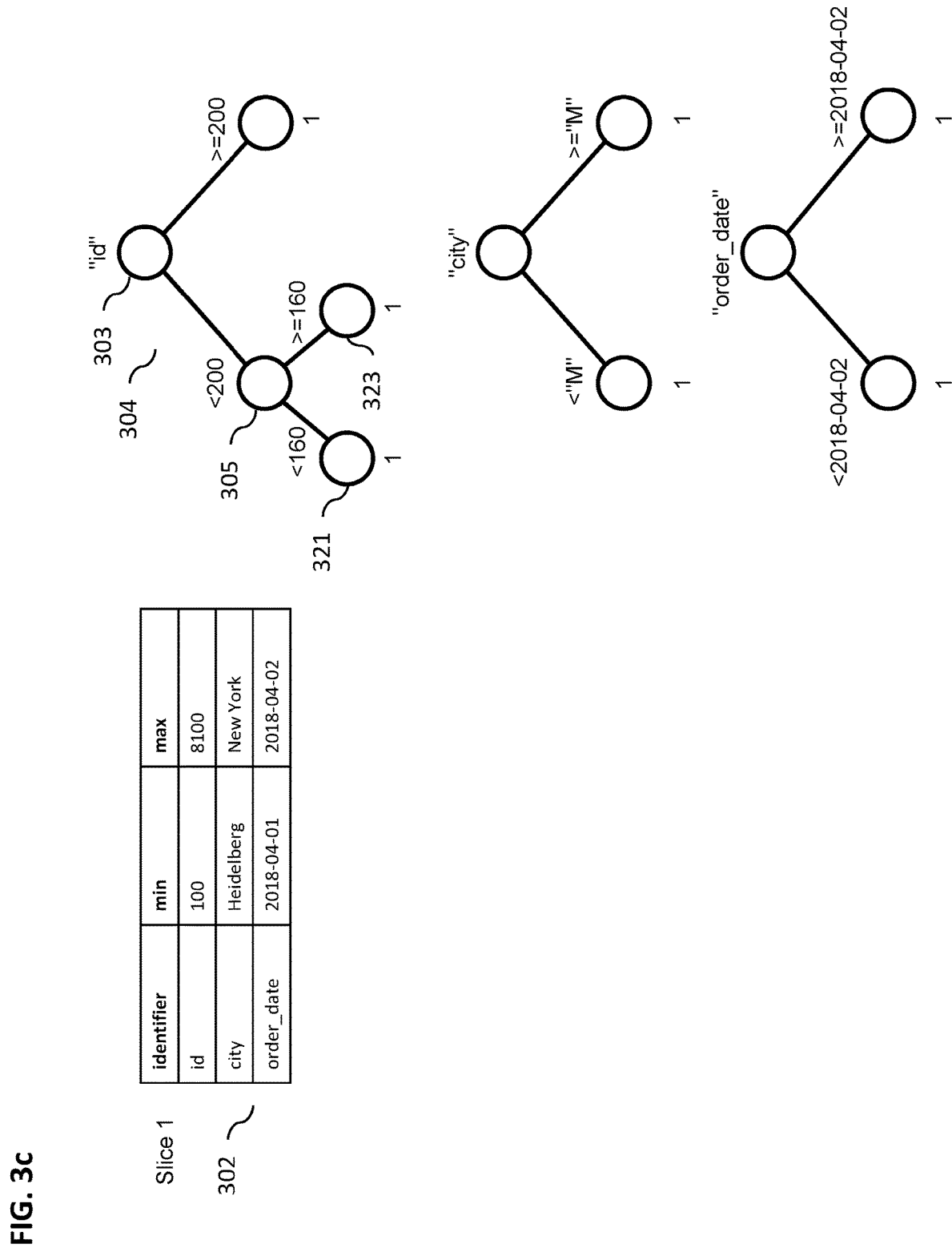

FIG. 3c illustrates further building of partitioning specification in connection with "id" index 304. In particular, various data may be inserted using the following INSERT statements (for ease of discussion, only portions of statements are illustrated below):

INSERT
{ "id": 140...
{ "id": 150...
{ "id": 160...
{ "id": 170...
{ "id": 180...
{ "id": 190...

To insert the above data, new nodes 321 and 323 may be linked to node 305. Node 321 may correspond to data values of "id" being less than 160 and node 323 may correspond to data values of "id" being greater than or equal to 160. The value of 160 may be arbitrarily selected. In some exemplary implementations, such selection may be based on a distribution of data that is being inserted (e.g., data values may be equally split by the selected value).

Figure 3D:
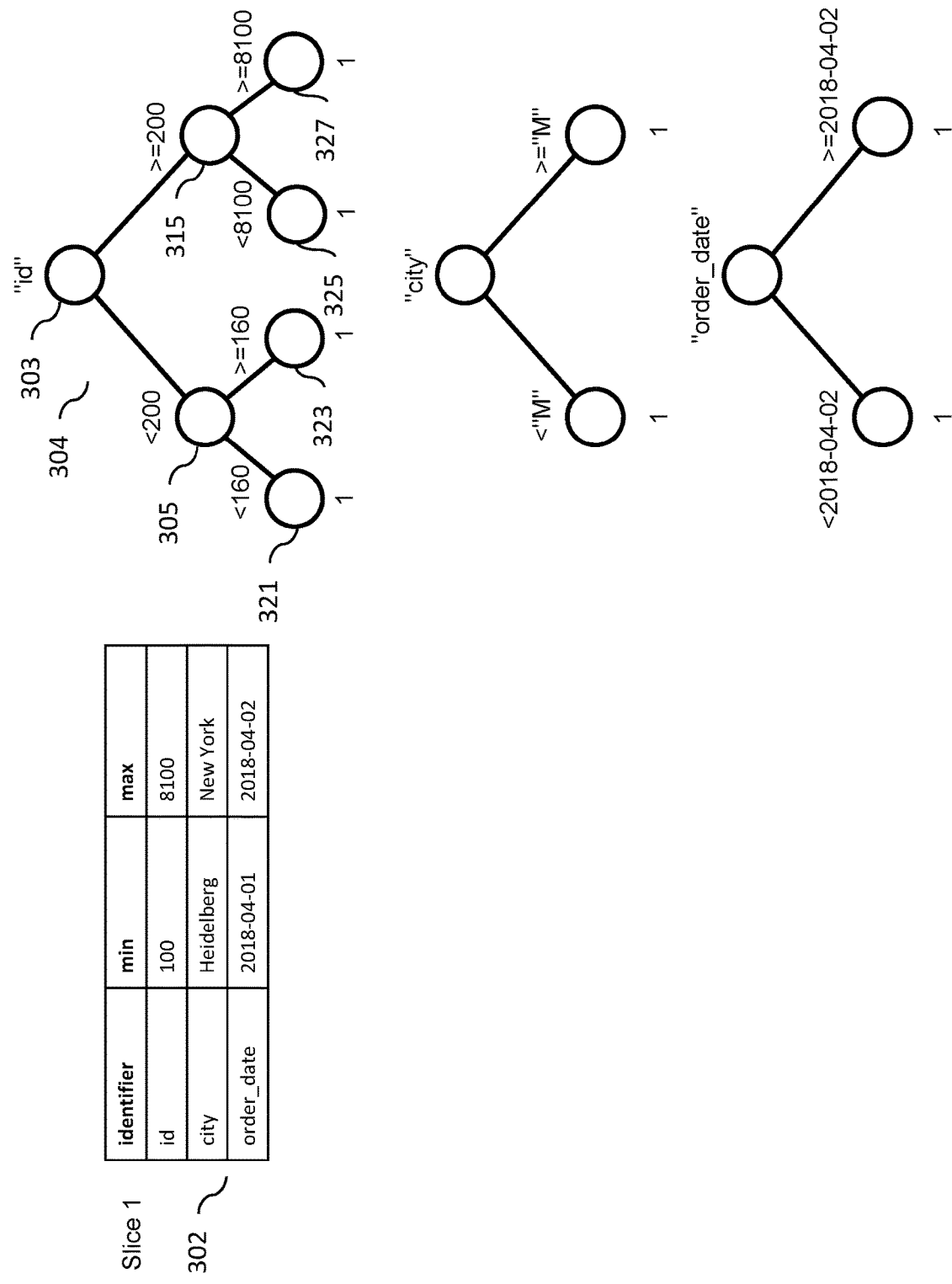

FIG. 3d illustrates even further growth of partitioning specification in connection with "id" index 304. As shown, data values in the "id" index tree may be inserted using the following INSERT statements (for ease of discussion, only portions of statements are illustrated below):

```
INSERT
{ "id": 8040...
{ "id": 8060...
{ "id": 8070...
{ "id": 8100...
```

To insert the above data, new nodes 325 and 327 may be linked to node 315. Node 325 may correspond to data values of "id" being greater than 200 and, in particular, being less than 8100, and node 327 may correspond to data values of "id" being greater than 200, and further, being greater than or equal to 8100. The value of 8100 may again be arbitrarily selected and may be based on a distribution of data that is being inserted (e.g., data values may be equally split by the selected value).

Figure 3E:
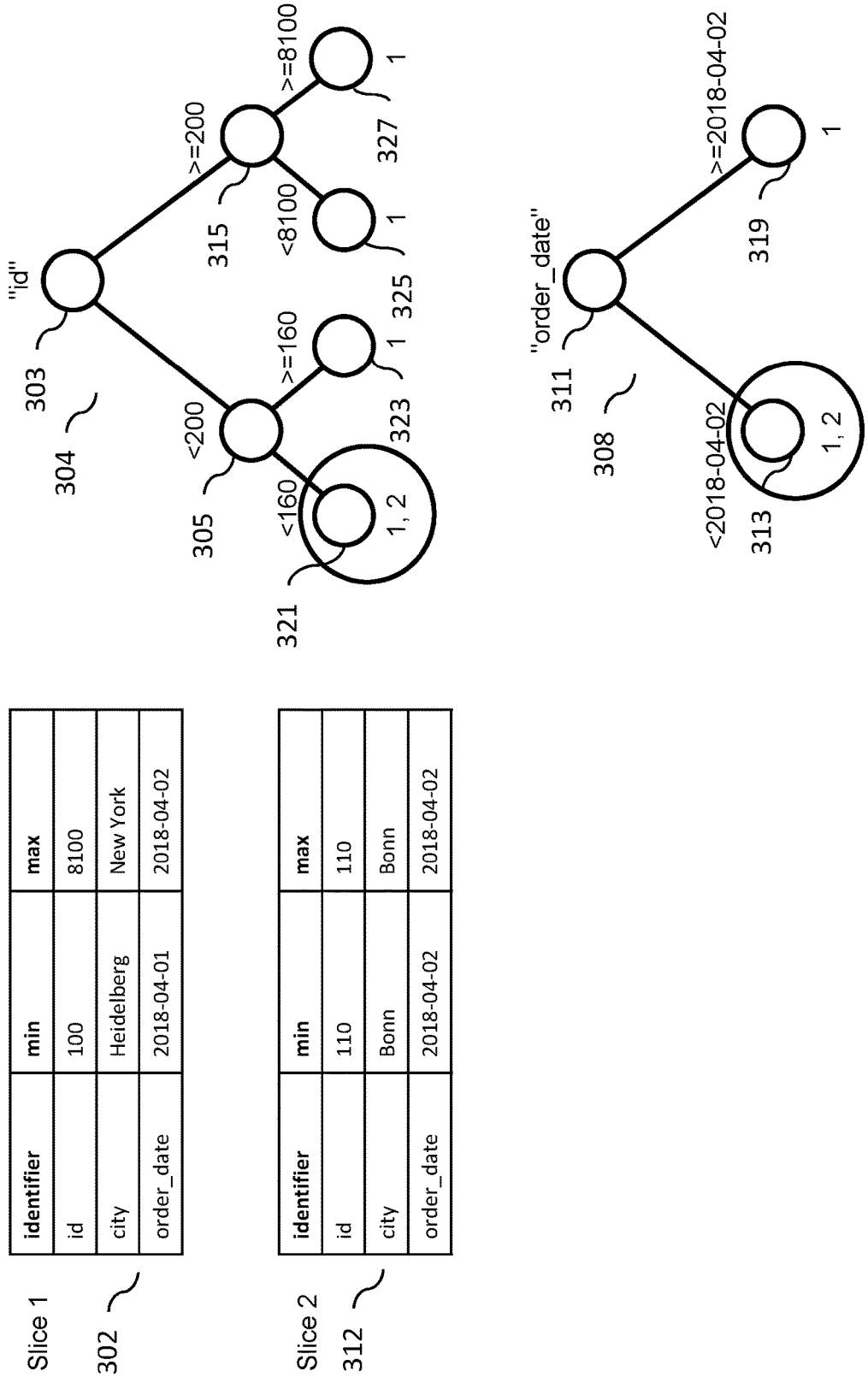

FIG. 3e illustrates insertion of data using the already generated partitioning specifications shown in FIGS. 3a-d. However, insertion of data into slice 1 302 is not permitted due to slice 1 being full. In this case, it may be determined that slice 2 312 may be used for insertion of data. The data may be inserted using the following statement: INSERT {"id": "110", "city": "Bonn", "order_date": "2018-04-02"}.

Based on the above INSERT statement, it appears that in the "id" index 304, the data may be inserted in accordance with the node 321, which corresponds to "id" data values being less than 200 and further less than 160 (i.e., "id": "110"). Moreover, in the "order_date" index 308, the data may be inserted in accordance with the node 313, which corresponds to "order_date" values being less than 2018-04-02 (i.e., "order_date": "2018-04-01"). It appears that nodes 321 and 313 correspond to slice 1 (as shown by the circles around the nodes) and hence, data may be inserted into slice 1 in accordance with the partitioning specification shown in FIG. 3e. However, because slice 1 is full, i.e., no more data may be inserted into slice 1, slice 2 312 may be created so that the above data (i.e., data in nodes 321 and 313) may be inserted into slice 2 312. In some implementations, slice 2 312 may be an existing slice or may be newly generated for insertion of the above data (and other data).

Figure 3F:
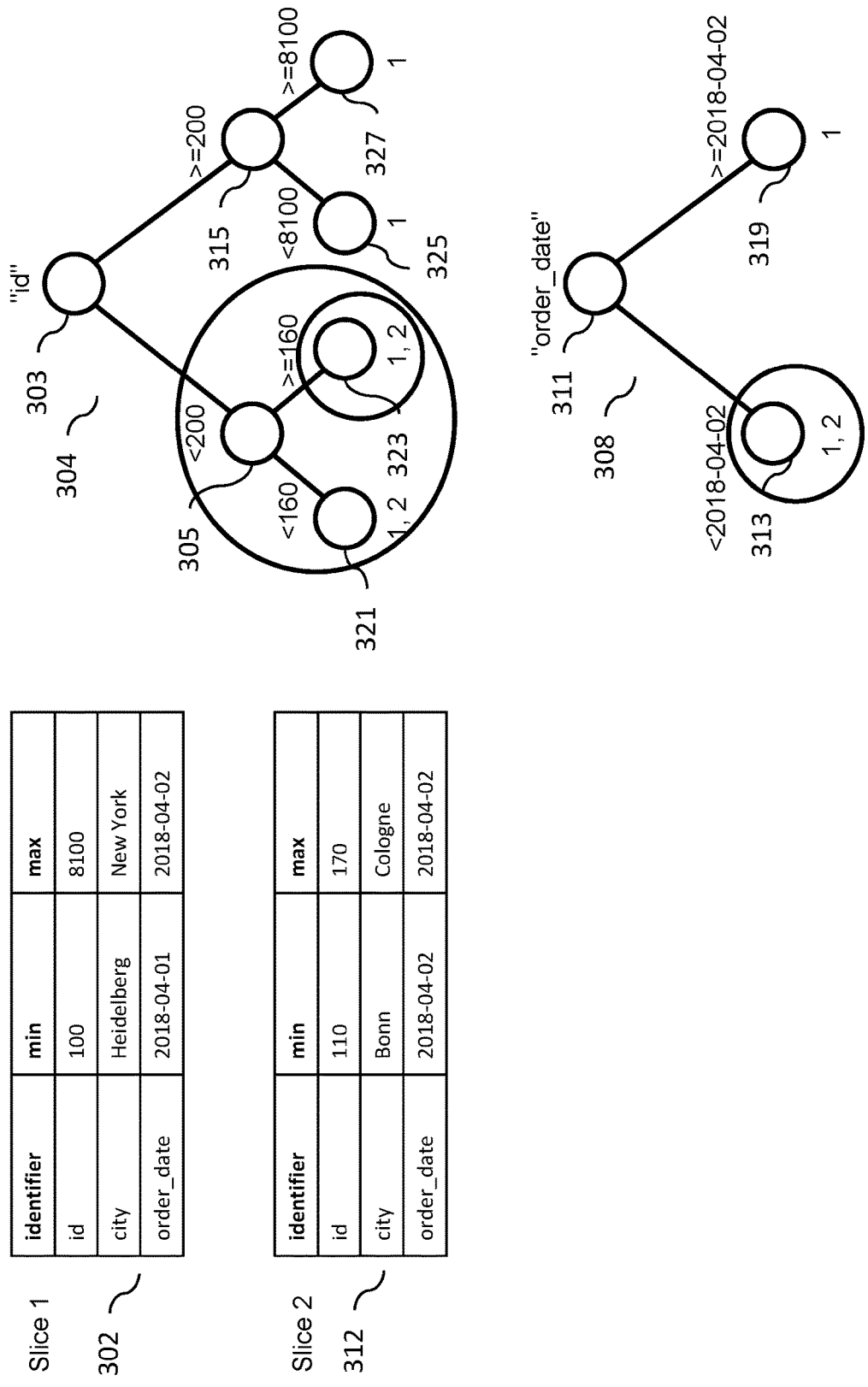

FIG. 3f illustrates an exemplary insertion of data based on a "distance" between minimum and maximum values of an index, where the "distance" may be defined in terms of hops in a tree. For example, in the statement INSERT {"id": "170", "city": "Cologne", "order_date": "2018-04-01"}, the data may be inserted into existing slices 1 and 2 (assuming slices are not full). As shown in FIG. 3f, in addition to slice 1 302 (which includes a broad range of index values), slice 2 312 may include data values corresponding to index "id" between 110 and 170, and thus, both nodes 321 and 323 of tree 304 may be used for insertion of data corresponding to slice 2. As such, node 323 may be used to determine which slice to use for insertion of data in accordance with the above statement, i.e., slice 1 and/or slice 2 may be used. If slice 1 is full, then slice 2 may be used.

Figure 3G:
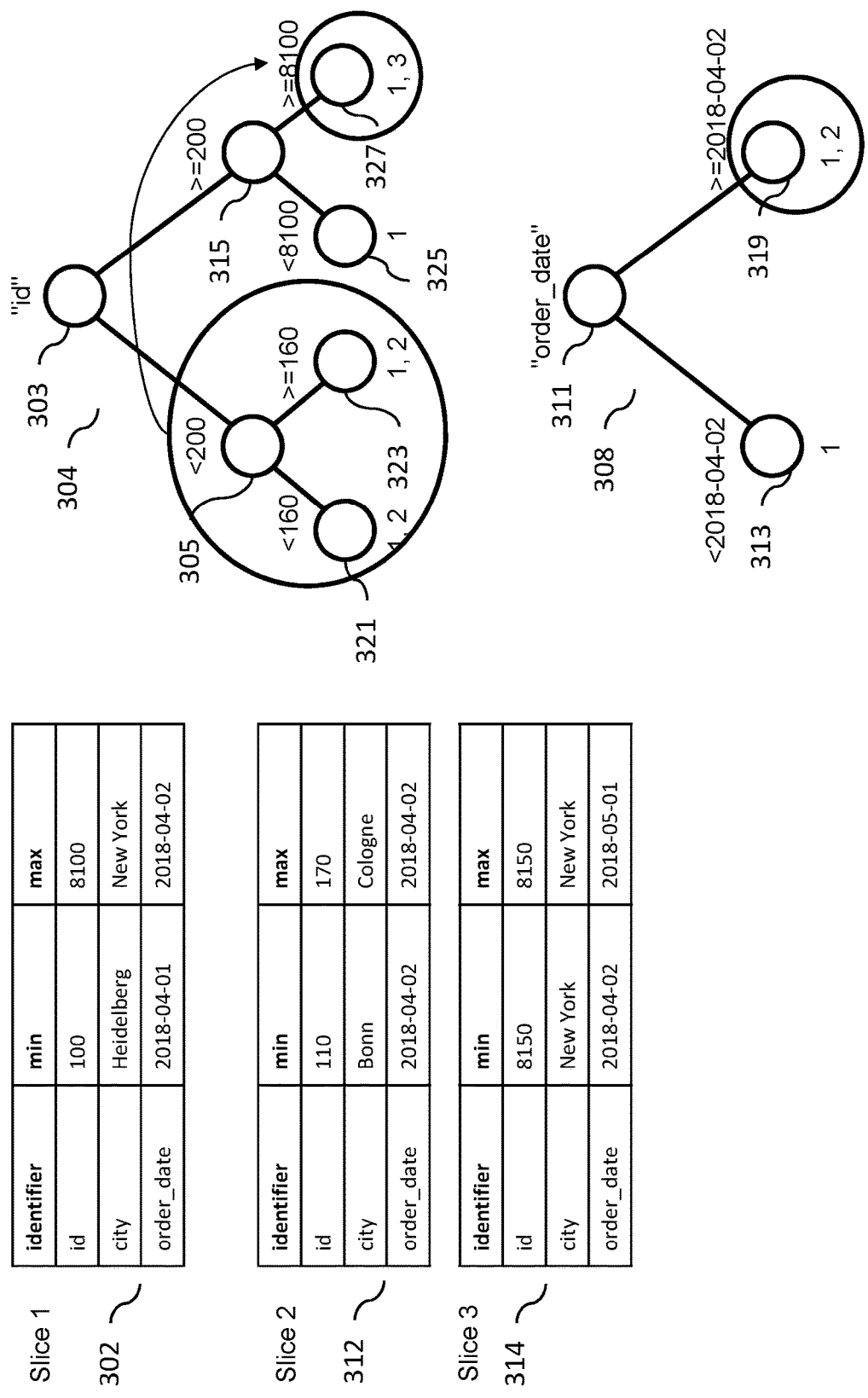

FIG. 3g illustrates an exemplary insertion of data based on a distance between minimum and maximum values of an index. However, the distance in this example is large and hence, a new slice may need to be created to accommodate insertion. For example, in the statement INSERT {"id": "8150", "city": "New York", "order_date": "2018-04-01"}, the distance between the "id" index of leaves 321 and 323 and the "id" value (i.e., "8150") specified in the INSERT statement is too large in terms of hops in the tree, and as such, a new slice may need to be created to accommodate insertion of this data. In this case, node 327 may correspond to creation of a new slice 3 314 that may accommodate insertion of the data in accordance with the INSERT statement above. Thus, a new slice (i.e., slice 3 314) may be created even though there is still space in slice 2 312. The distance in the tree may suggest that data is not closely related and, hence, should be physically placed in a different slice.

The above data inserts may be determined using one or more insert policies that may be stored on a database management system (e.g., system 100 shown in FIG. 1). In some implementations, such insert policies may be pluggable and may be altered for a particular collection of data when some data has already been stored. This means that there is no need to move data according to the new policy. The new policy may specify how new data may be inserted and may define correlation between data values and slices. As shown in FIGS. 3a-g, an insert policy may be generated that may include one or more of the following provisions: (1) adding more values for a leaf may cause an extension of the tree; (2) the first slice may always be completely filled; (3) once the first slice is full, first INSERT of new data may generate a new slice (e.g., "Slice 2" (as shown in FIGS. 3e-f)), second or following INSERT of new data may place the data either into the same new slice (i.e., "Slice 2") or generate yet another new slice ("Slice 3" (e.g., as shown in FIG. 3g)), whereby the decision to generate new slices may be based on a "distance" in the tree (the "distance" may be selected based on the data being inserted, data already stored, etc., e.g., data may be inserted into an existing slice, if the data value is only <=2 hops away in the tree from an existing slice; if the data value is >2, a new slice may be generated). In an alternate implementations, instead of determining whether or not to generate a new slice, the current subject matter may have an insert policy that may require generation of a new slice regardless of whether the first slice is full, assuming the distance between data values is within a predetermined threshold. In yet another alternate implementation, the current subject matter system may wait until the first slice is full before it generate a new slice. The current subject matter may measure the maximum distance in the tree and uses the determined distance (i.e., number of hops) for determination of where to inserts future data values.

Figure 4:
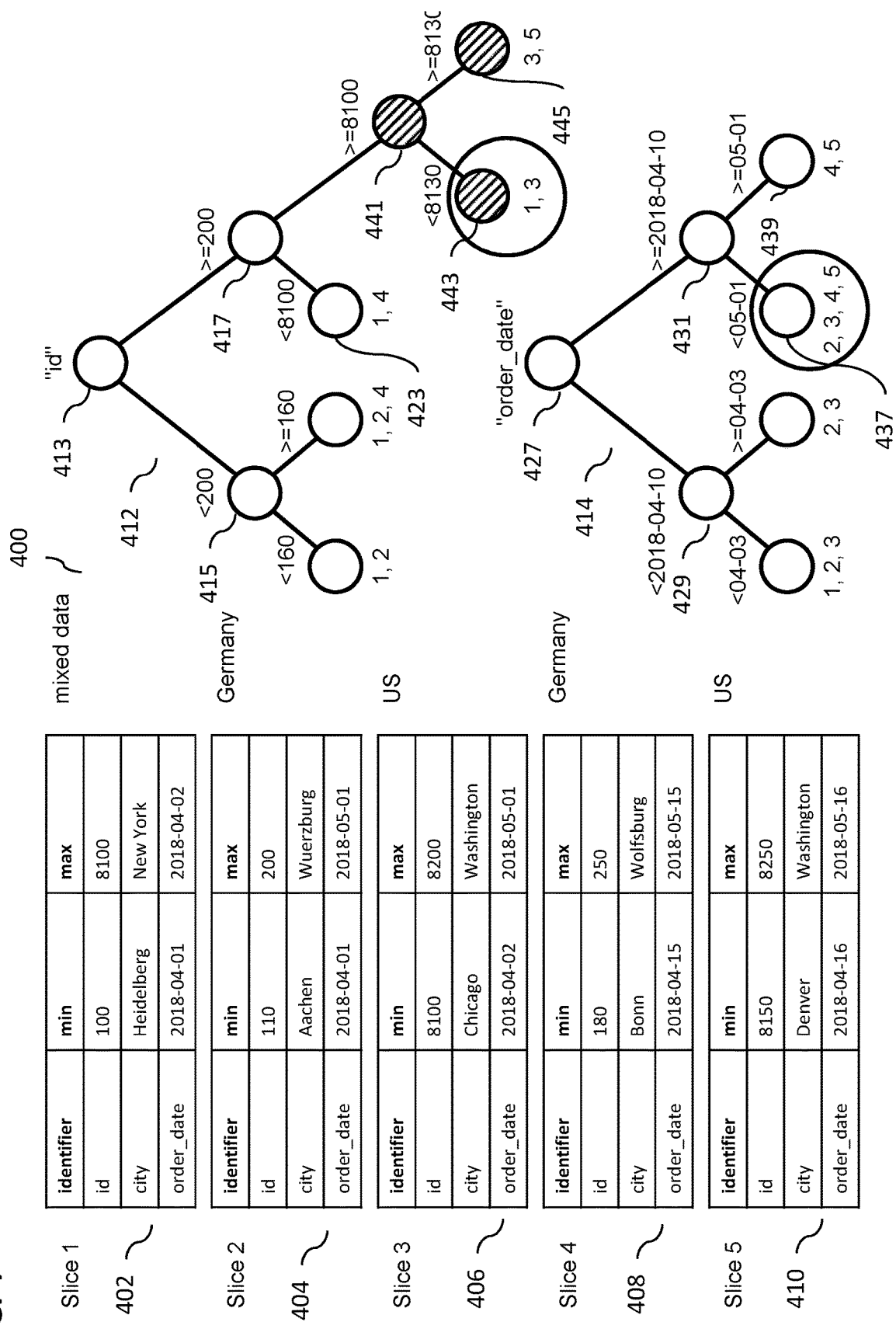
FIG. 4 illustrates another exemplary system for generating partitioning specifications, according to some implementations of the current subject matter.

FIG. 4 illustrates another exemplary system 400 for generating partitioning specifications, according to some implementations of the current subject matter. The system 400 is similar to the system 200 shown in FIG. 2. It may include slices 1-5 402-414 and generated partitioning trees 412 and 414, where tree 412 may be generated for the index "id" and tree 414 may be generated for the index "order_date". The tree 412 may include a parent node 413 linked to child nodes 415 and 417 corresponding to values shown in FIG. 4. Each node 415 and 417 may include further respective child nodes. In particular, node 417 may include a child node 441 that may correspond to index "id" data values being greater than or equal to 8100. Further, the child node 441 may include its own child nodes 443 (values less than 8130) and 445 (values greater than or equal to 8130). Similarly tree 414 may include child nodes 429 and 431 along with their respective child nodes.

Based on the structure of the trees 412 and 414, an insert statement of INSERT "id": 8115, "city": "Washington", "order_date": "2018-04-11" may cause insertion of data into slice 3 (as shown by the circles around nodes 443 and 437), because slice 3 is the only common slice associated with leaves 443 and 437. If slice 3 is full, a new slice may be generated for insertion of this data.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 5:
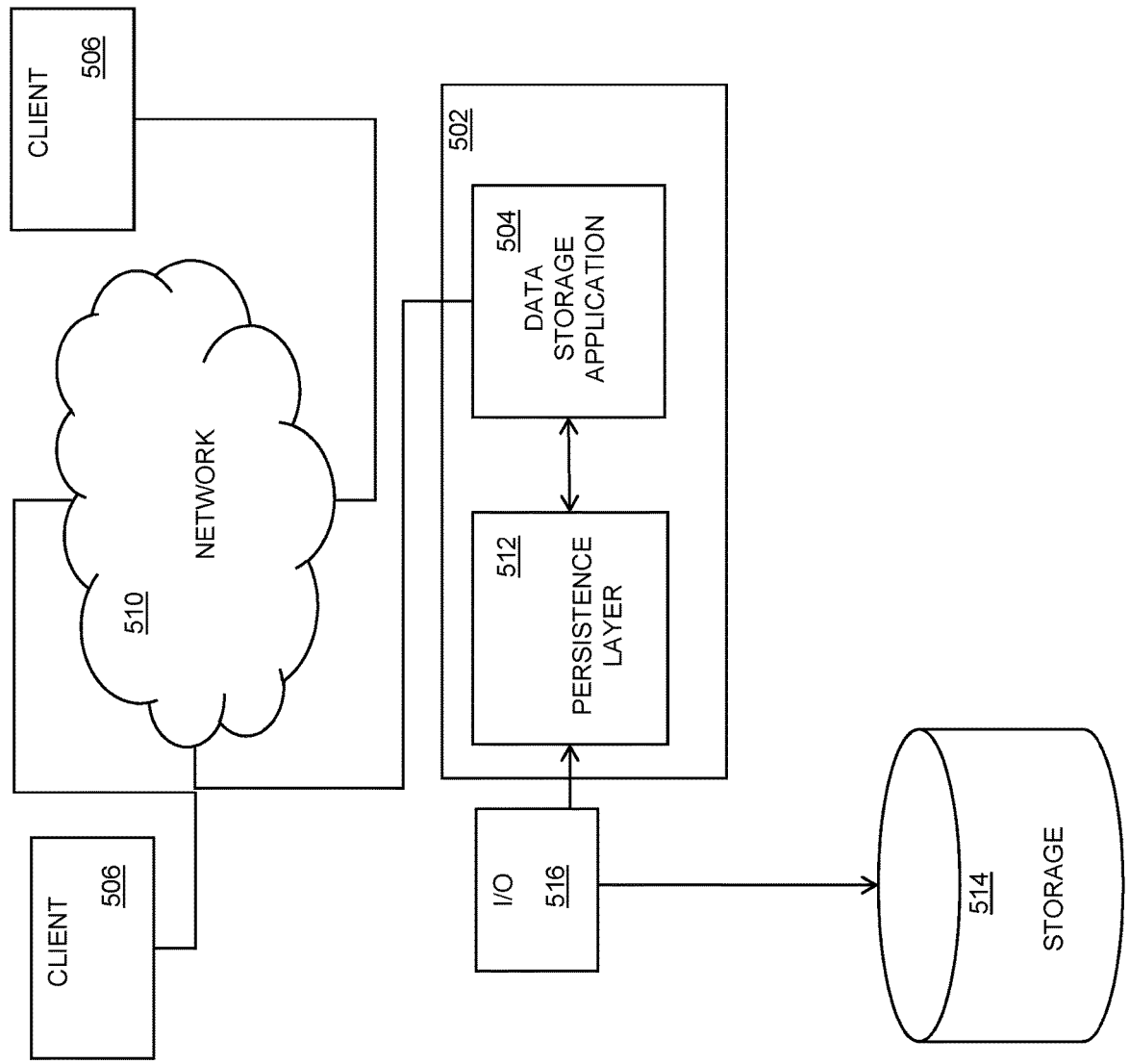
FIG. 5 is a diagram illustrating an exemplary system including a data storage application, according to some implementations of the current subject matter.

FIG. 5 illustrates an exemplary system 500 in which a computing system 502, which can include one or more programmable processors that can be collocated, linked over one or more networks, etc., executes one or more modules, software components, or the like of a data storage application 504, according to some implementations of the current subject matter. The data storage application 504 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 502 as well as to remote users accessing the computing system 502 from one or more client machines 506 over a network connection 510. One or more user interface screens produced by the one or more first modules can be displayed to a user, either via a local display or via a display associated with one of the client machines 506. Data units of the data storage application 504 can be transiently stored in a persistence layer 512 (e.g., a page buffer or other type of temporary persistency layer), which can write the data, in the form of storage pages, to one or more storages 514, for example via an input/output component 516. The one or more storages 514 can include one or more physical storage media or devices (e.g. hard disk drives, persistent flash memory, random access memory, optical media, magnetic media, and the like) configured for writing data for longer term storage. It should be noted that the storage 514 and the input/output component 516 can be included in the computing system 502 despite their being shown as external to the computing system 502 in FIG. 5.

Data retained at the longer term storage 514 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 6:
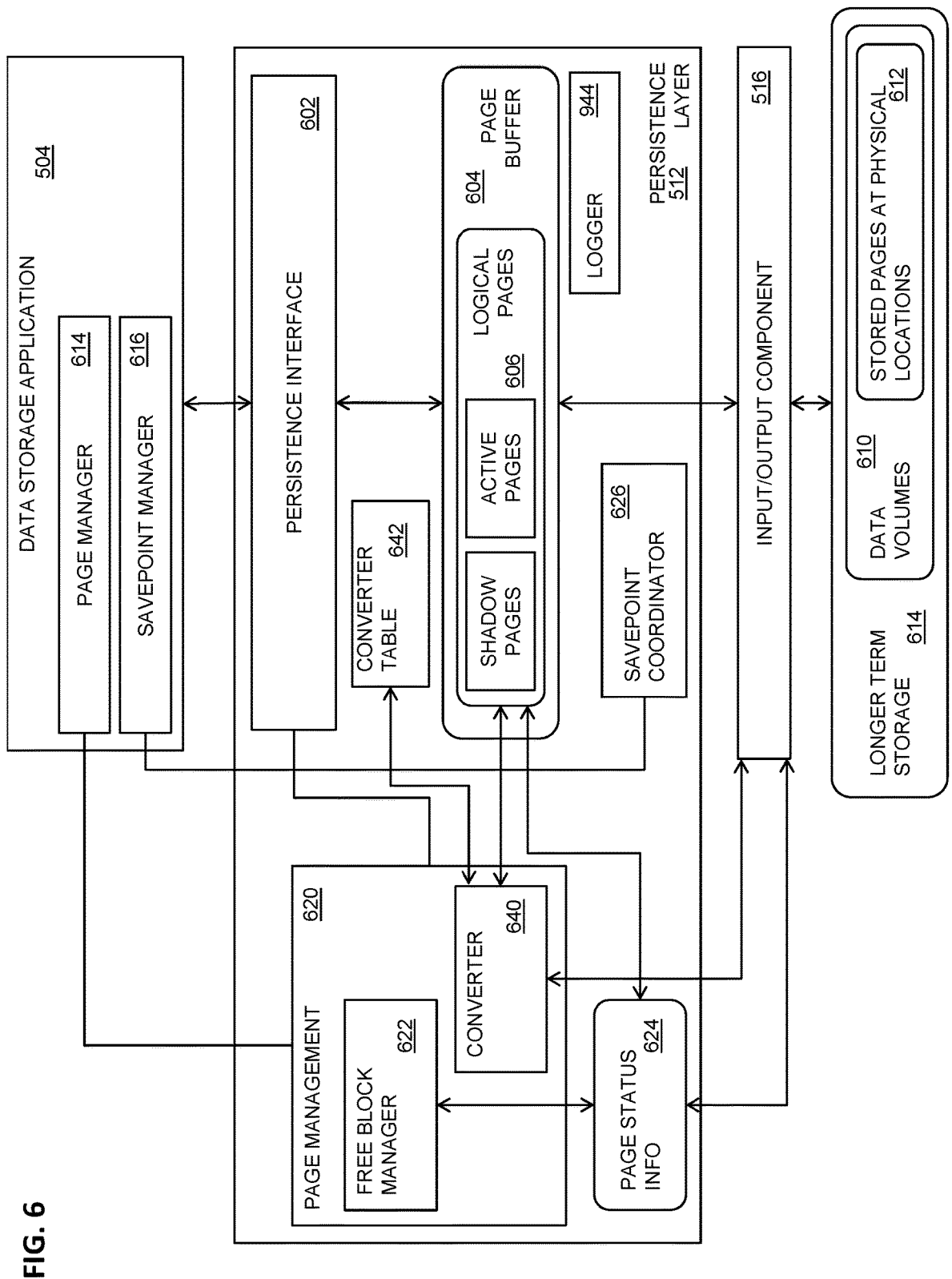
FIG. 6 is a diagram illustrating details of the system of FIG. 5.

FIG. 6 illustrates exemplary software architecture 600, according to some implementations of the current subject matter. A data storage application 504, which can be implemented in one or more of hardware and software, can include one or more of a database application, a network-attached storage system, or the like. According to at least some implementations of the current subject matter, such a data storage application 504 can include or otherwise interface with a persistence layer 512 or other type of memory buffer, for example via a persistence interface 602. A page buffer 604 within the persistence layer 512 can store one or more logical pages 606, and optionally can include shadow pages, active pages, and the like. The logical pages 606 retained in the persistence layer 512 can be written to a storage (e.g. a longer term storage, etc.) 514 via an input/output component 516, which can be a software module, a sub-system implemented in one or more of software and hardware, or the like. The storage 514 can include one or more data volumes 610 where stored pages 612 are allocated at physical memory blocks.

In some implementations, the data storage application 504 can include or be otherwise in communication with a page manager 614 and/or a savepoint manager 616. The page manager 614 can communicate with a page management module 620 at the persistence layer 512 that can include a free block manager 622 that monitors page status information 624, for example the status of physical pages within the storage 514 and logical pages in the persistence layer 512 (and optionally in the page buffer 604). The savepoint manager 616 can communicate with a savepoint coordinator 626 at the persistence layer 512 to handle savepoints, which are used to create a consistent persistent state of the database for restart after a possible crash.

In some implementations of a data storage application 504, the page management module of the persistence layer 512 can implement a shadow paging. The free block manager 622 within the page management module 620 can maintain the status of physical pages. The page buffer 604 can include a fixed page status buffer that operates as discussed herein. A converter component 640, which can be part of or in communication with the page management module 620, can be responsible for mapping between logical and physical pages written to the storage 514. The converter 640 can maintain the current mapping of logical pages to the corresponding physical pages in a converter table 642. The converter 640 can maintain a current mapping of logical pages 606 to the corresponding physical pages in one or more converter tables 642. When a logical page 606 is read from storage 514, the storage page to be loaded can be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 can ensure that changes made in the data storage application 504 are durable and that the data storage application 504 can be restored to a most recent committed state after a restart. Writing data to the storage 514 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 644 can also be included to store the changes made to the data of the data storage application in a linear log. The logger component 644 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 644 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 512 can use a combination of undo log entries (from one or more logs) and shadow paging.

The persistence interface 602 can handle read and write requests of stores (e.g., in-memory stores, etc.). The persistence interface 602 can also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 644 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 644 can write a database log (or simply referred to herein as a "log") sequentially into a memory buffer in natural order (e.g., sequential order, etc.). If several physical hard disks/storage devices are used to store log data, several log partitions can be defined. Thereafter, the logger 644 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 504 can use shadow paging so that the savepoint manager 616 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 7:
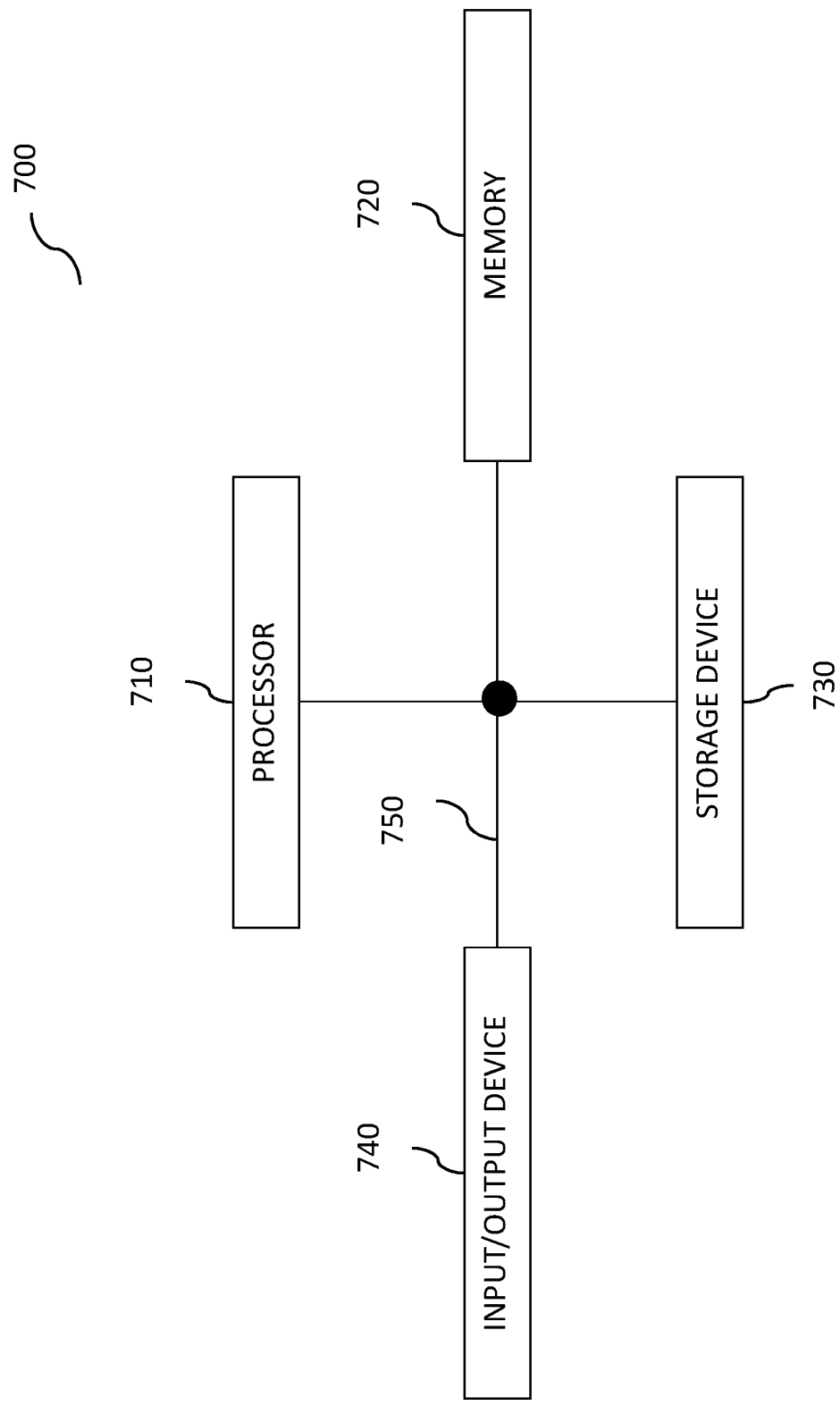
FIG. 7 is an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

FIG. 8 illustrates an exemplary method 800 for implicitly partitioning data, according to some implementations of the current subject matter. At 802, an index (e.g., "id", "city", "order_date", etc.) in a plurality of indexes may be selected. The index may correspond to a plurality of ranges of data values (e.g., "100-8100", etc.) stored in a plurality of database slices (e.g., Slices 1-5) of a database (as shown in FIG. 1). At 804, a partitioning structure may be generated for the selected index (structures 212, 214, as shown in FIG. 2). The partitioning structure may include a plurality of hierarchically arranged nodes (e.g., nodes 213, 215, 217, etc., as shown in FIG. 2). Each node may correspond to a range of data values (e.g., node 215 corresponding to "id" values less than 300, as shown in FIG. 2) in the plurality of ranges of data values stored and at least one database slice storing the corresponding range of data values. At 806, another range of data values may be received for storage in the database (e.g., INSERT {"id": 100, "city": "Heidelberg", "order_date": "2018-04-01"}). At 808, using the generated partitioning structure, a node in the generated partitioning structure corresponding to the received range of data values and at least one corresponding database slice configured to store the received another range of data values may be identified (e.g., Slice 1). At 810, the received range of data values may be stored in the identified at least one database slice.

In some implementations, the current subject matter can include one or more of the following optional features. In some implementations, identification of nodes may include identifying another database slice configured to store the received another range of data values upon a determination that the identified database slice is unable to store the received another range of data values. The storage may then include storing the received another range of data values in the identified another database slice.

In some implementations, identification of nodes may include generating another database slice configured to store the received another range of data values. The method may further include modifying the generated partitioning structure to include at least another node corresponding to the received another range of data values. Another database slice may be generated upon a determination that the identified database slice is unable to store the received another range of data values. Then, storage may include storing the received another range of data values in the generated another database slice.

In some implementations, at least one of the node and the database slice may be identified using the selected index.

In some implementations, identification may be performed using at least one insert policy defining at least one of the node in the generated partitioning structure corresponding to the received another range of data values and at least one corresponding database slice configured to store the received another range of data values.

In some implementations, identification of nodes may include identifying, based on the insert policy, using the generated partitioning structure, another node in the generated partitioning structure corresponding to the received another range of data values using a predetermined threshold hop distance between the identified node and the another node and identifying at least one database slice corresponding to the another node configured to store the received another range of data values. The predetermined threshold hop distance may be at least two hops.

In some implementations, storing may include at least one of the following: insertion of the received another range of data into the identified at least one database slice, modification of data stored in the identified at least one database slice using the received another range of data, deletion of data stored in the identified at least one database slice, and any combination thereof.

In some implementations, the method may further include selecting another index in a plurality of indexes, which may correspond to another plurality of ranges of data values stored in the plurality of database slices of the database, generating another partitioning structure for the selected another index, which may include another plurality of hierarchically arranged nodes and each node may correspond to another range of data values in the plurality of another ranges of data values stored and the at least one database slice storing the corresponding another range of data values, identifying, using the generated another partitioning structure and the generated partitioning structure, at least one database slice configured to store the received another range of data values, and storing the received another range of data values in the identified at least one database slice.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    selecting an index in a plurality of indexes, the index corresponding to a plurality of ranges of data values stored in a plurality of database slices of a database;
    generating a partitioning structure for the selected index, the partitioning structure including a plurality of hierarchically arranged nodes, each node corresponding to a range of data values in the plurality of ranges of data values stored and at least one database slice storing the corresponding range of data values;
    receiving another range of data values for storage in the database;
    identifying, using the generated partitioning structure, a node in the generated partitioning structure corresponding to the received another range of data values and at least one corresponding database slice configured to store the received another range of data values; and
    storing the received another range of data values in the identified at least one database slice.

2. The method according to claim 1, wherein the identifying includes identifying another database slice configured to store the received another range of data values upon a determination that the identified database slice is unable to store the received another range of data values.

3. The method according to claim 2, wherein the storing includes storing the received another range of data values in the identified another database slice.

4. The method according to claim 1, wherein the identifying includes generating another database slice configured to store the received another range of data values.

5. The method according to claim 4, further comprising modifying the generated partitioning structure to include at least another node corresponding to the received another range of data values.

6. The method according to claim 4, wherein the another database slice is generated upon a determination that the identified database slice is unable to store the received another range of data values.

7. The method according to claim 6, wherein the storing includes storing the received another range of data values in the generated another database slice.

8. The method according to claim 1, wherein at least one of the node and the database slice are identified using the selected index.

9. The method according to claim 1, wherein the identifying is performed using at least one insert policy defining at least one of the node in the generated partitioning structure corresponding to the received another range of data values and at least one corresponding database slice configured to store the received another range of data values.

10. The method according to claim 9, wherein the identifying includes identifying, in accordance with the insert policy, using the generated partitioning structure, another node in the generated partitioning structure corresponding to the received another range of data values using a predetermined threshold hop distance between the identified node and the another node and identifying at least one database slice corresponding to the another node configured to store the received another range of data values.

11. The method according to claim 10, wherein the predetermined threshold hop distance is at least two hops.

12. The method according to claim 1, wherein the storing includes at least one of the following: insertion of the received another range of data into the identified at least one database slice, modification of data stored in the identified at least one database slice using the received another range of data, deletion of data stored in the identified at least one database slice, and any combination thereof.

13. The method according to claim 1, further comprising selecting another index in a plurality of indexes, the another index corresponding to a another plurality of ranges of data values stored in the plurality of database slices of the database;
    generating another partitioning structure for the selected another index, the another partitioning structure including another plurality of hierarchically arranged nodes, each node corresponding to another range of data values in the plurality of another ranges of data values stored and the at least one database slice storing the corresponding another range of data values;
    identifying, using the generated another partitioning structure and the generated partitioning structure, at least one database slice configured to store the received another range of data values; and storing the received another range of data values in the identified at least one database slice.

14. A system comprising:
at least one programmable processor; and
a non-transitory machine-readable medium storing instructions that, when executed by the at least one programmable processor, cause the at least one programmable processor to perform operations comprising:
selecting an index in a plurality of indexes, the index corresponding to a plurality of ranges of data values stored in a plurality of database slices of a database;
generating a partitioning structure for the selected index, the partitioning structure including a plurality of hierarchically arranged nodes, each node corresponding to a range of data values in the plurality of ranges of data values stored and at least one database slice storing the corresponding range of data values;
receiving another range of data values for storage in the database;
identifying, using the generated partitioning structure, a node in the generated partitioning structure corresponding to the received another range of data values and at least one corresponding database slice configured to store the received another range of data values; and
storing the received another range of data values in the identified at least one database slice.

15. The system according to claim 14, wherein the identifying includes identifying another database slice configured to store the received another range of data values upon a determination that the identified database slice is unable to store the received another range of data values;
wherein the storing includes storing the received another range of data values in the identified another database slice.

16. The system according to claim 14, wherein the identifying includes generating another database slice configured to store the received another range of data values;
the operations further comprise modifying the generated partitioning structure to include at least another node corresponding to the received another range of data values;
the another database slice is generated upon a determination that the identified database slice is unable to store the received another range of data values;
the storing includes storing the received another range of data values in the generated another database slice.

17. The system according to claim 14, wherein at least one of the node and the database slice are identified using the selected index.

18. The system according to claim 14, wherein the identifying is performed using at least one insert policy defining at least one of the node in the generated partitioning structure corresponding to the received another range of data values and at least one corresponding database slice configured to store the received another range of data values;
the identifying includes identifying, in accordance with the insert policy, using the generated partitioning structure, another node in the generated partitioning structure corresponding to the received another range of data values using a predetermined threshold hop distance between the identified node and the another node and identifying at least one database slice corresponding to the another node configured to store the received another range of data values.

19. The system according to claim 14, wherein the operations further comprise
selecting another index in a plurality of indexes, the another index corresponding to a another plurality of ranges of data values stored in the plurality of database slices of the database;
generating another partitioning structure for the selected another index, the another partitioning structure including another plurality of hierarchically arranged nodes, each node corresponding to another range of data values in the plurality of another ranges of data values stored and the at least one database slice storing the corresponding another range of data values;
identifying, using the generated another partitioning structure and the generated partitioning structure, at least one database slice configured to store the received another range of data values; and
storing the received another range of data values in the identified at least one database slice.

20. A computer program product comprising a non-transitory machine-readable medium storing instructions that, when executed by at least one programmable processor, cause the at least one programmable processor to perform operations comprising:
selecting an index in a plurality of indexes, the index corresponding to a plurality of ranges of data values stored in a plurality of database slices of a database;
generating a partitioning structure for the selected index, the partitioning structure including a plurality of hierarchically arranged nodes, each node corresponding to a range of data values in the plurality of ranges of data values stored and at least one database slice storing the corresponding range of data values;
receiving another range of data values for storage in the database;
identifying, using the generated partitioning structure, a node in the generated partitioning structure corresponding to the received another range of data values and at least one corresponding database slice configured to store the received another range of data values; and
storing the received another range of data values in the identified at least one database slice.

\* \* \* \* \*